(12) United States Patent
Barnett et al.

(10) Patent No.: US 9,760,918 B2
(45) Date of Patent: Sep. 12, 2017

(54) SYSTEM AND METHOD FOR ONLINE COLLECTION AND DISTRIBUTION OF RETAIL AND SHOPPING RELATED INFORMATION

(71) Applicant: COLLECTIVE BIAS, INC., Winston-Salem, NC (US)

(72) Inventors: Kenneth A. Barnett, Bloomfield Hills, MI (US); John Andrews, Fayetteville, AR (US); Jay Thornton, Rogers, AR (US)

(73) Assignee: COLLECTIVE BIAS, INC., Winston-Salem, NC (US)

( * ) Notice: Subject to any disclaimer, the term of this patent is extended or adjusted under 35 U.S.C. 154(b) by 695 days.

(21) Appl. No.: 13/653,846

(22) Filed: Oct. 17, 2012

(65) Prior Publication Data
US 2014/0108207 A1    Apr. 17, 2014

(51) Int. Cl.
G06Q 30/00    (2012.01)
G06Q 30/06    (2012.01)
G06Q 30/02    (2012.01)

(52) U.S. Cl.
CPC ............ G06Q 30/06 (2013.01); G06Q 30/02 (2013.01)

(58) Field of Classification Search
CPC ..... G06Q 30/0643; G06Q 30/06; G06Q 30/02
USPC .............................................. 705/27.2, 26.1
See application file for complete search history.

(56) References Cited

U.S. PATENT DOCUMENTS 6,615,184 B1    9/2003    Hicks
8,160,917 B1    4/2012    Solanki et al.
8,548,909 B1 *  10/2013   Snow ................ G06F 17/30896
                                                705/42
2004/0107145 A1 * 6/2004  Skurdal ................ G06Q 30/06
                                                705/26.41

(Continued)

FOREIGN PATENT DOCUMENTS

CA        2763808 A1      3/2012

OTHER PUBLICATIONS

U.S. Appl. No. 13/603,517, filed Sep. 5, 2012.
Ratsimor, Olga, et al., "eNcentive: A Framework for Intelligent Marketing in Mobile Peer-To-Peer Environments," Department of Computer Science and Electrical Engineering, University of Maryland, 2005.

(Continued)

Primary Examiner — Yogesh C Garg
Assistant Examiner — Lalith Duraisamygurusamy
(74) Attorney, Agent, or Firm — Allen, Dyer, Dopplet + Gilchrist, P.A. Attorneys at Law

(57) ABSTRACT

A method includes receiving and storing, at a server, retail product data related to a retail product offered for sale at a retailer, the retail product data including text data corresponding to a description of the retail product, price data corresponding to a price of the retail product, and image data corresponding to a graphical image of the retail product. The method also includes receiving, at the server, links to content generated by a content-generating user, the content being associated with retail products. The method also includes identifying, at the server, a link from the plurality of links that corresponds to content associated with the retail product offered for sale at the retailer. The method also includes generating, at the server, a web page that displays the product data, including the text data, the price data, and the image data for the retail product offered for sale at the retailer and that displays the identified link.

14 Claims, 8 Drawing Sheets

(56) References Cited

U.S. PATENT DOCUMENTS

| | | | |
|---|---|---|---|
| 2005/0160004 A1* | 7/2005 | Moss | G06Q 30/00 705/14.35 |
| 2005/0160014 A1 | 7/2005 | Moss et al. | |
| 2005/0289131 A1 | 12/2005 | Aenlle et al. | |
| 2006/0064343 A1 | 3/2006 | Burke et al. | |
| 2006/0143066 A1 | 6/2006 | Calabria | |
| 2006/0143068 A1 | 6/2006 | Calabria | |
| 2007/0061245 A1* | 3/2007 | Ramer | G06F 17/30867 705/37 |
| 2007/0168357 A1* | 7/2007 | Mo | G06Q 10/04 |
| 2008/0046406 A1* | 2/2008 | Seide | G06F 17/30743 |
| 2009/0116668 A1* | 5/2009 | Davidson | G06Q 30/0601 381/119 |
| 2009/0132311 A1* | 5/2009 | Klinger | G06Q 30/02 705/7.32 |
| 2009/0249451 A1 | 10/2009 | Su et al. | |
| 2010/0023863 A1* | 1/2010 | Cohen-Martin | G06Q 30/02 715/723 |
| 2010/0313009 A1 | 12/2010 | Combet et al. | |
| 2010/0321405 A1* | 12/2010 | MacInnes | G06T 3/00 345/635 |
| 2011/0029360 A1* | 2/2011 | Gollapalli | G06Q 30/02 705/14.1 |
| 2011/0038470 A1* | 2/2011 | Kent | H04M 1/575 379/142.04 |
| 2011/0087539 A1* | 4/2011 | Rubinstein | G06Q 30/02 705/14.41 |
| 2012/0124617 A1 | 5/2012 | Krishnamoorthy et al. | |
| 2012/0158544 A1* | 6/2012 | Nations | G06Q 30/0623 705/26.61 |

OTHER PUBLICATIONS

Final Office Action regarding U.S. Appl. No. 13/603,517, dated Apr. 2, 2015.
Mystery Shop Forum, "Mystery Shopping Job Board," available Aug. 2, 2011, retrieved from https: // web. archive.org / web / 20110802222653 / http: / /www.mysteryshopforum.com /index, on Aug. 7, 2014.
Non-Final Office Action regarding U.S. Appl. No. 13/603,517, dated Feb. 28, 2014.
Non-Final Office action regarding U.S. Appl. No. 13/603,517, dated Aug. 15, 2014.
Office Action from the Canadian Intellectual Property Office regarding Canadian Patent Application No. 2,825,570, dated Apr. 7, 2015.
Office Action from the Canadian Patent Office regarding Candanian Patent Application No. 2,825,567, dated Feb. 19, 2015.
Second Office Action from the Canadian Intellectual Property Office regarding Canadian Patent Application No. 2,825,567, dated Feb. 17, 2016.
Second Office Action from the Canadian Intellectual Property Office regarding Canadian Application No. 2,825,570, dated Jun. 7, 2016.
Amazon.com, http://web.archive.orq/web/20120502124019/http:// www.amazon.com/Dr-McDouqalls-Rioht-Foods-3-4-Ounce/dp/ B000FFIEL2, May 2, 2012.
Report Under Section 17(5)(b) and Examination Opinion from the United Kingdom Intellectual Property Office regarding Application No. GB1315807.6, dated Feb. 17, 2014.
Report Under Section 17(5)(b) and Examination Opinion from the United Kingdom Intellectual Property Office regarding Application No. GB1318314.0, dated Feb. 17, 2014.
Non-Final Office Action regarding U.S. Appl. No. 13/603,517, dated Nov. 6, 2015.

* cited by examiner

SYSTEM AND METHOD FOR ONLINE COLLECTION AND DISTRIBUTION OF RETAIL AND SHOPPING RELATED INFORMATION

FIELD

The present disclosure relates to systems and method for online collection and distribution of retail and shopping related information and, in particular, to online collection and distribution of retail circular data and related user-generated content.

BACKGROUND

This section provides background information related to the present disclosure which is not necessarily prior art.

Retail companies that are in the business of selling products to consumers, such as goods and services, generally need to communicate and advertise information about their products to consumers. For example, retailers generally need to communicate and advertise information about their current and upcoming sales and special deals. In this way, such retailers may generate periodic circular advertisements that may communicate information regarding current and upcoming sales and special deals for a specific period of time. For example, a grocery store retailer may generate a weekly or even daily circular that includes listings and advertisements for the sales and special deals for certain grocery products for that week or day. These circulars may be printed and distributed to shoppers and consumers by hand at the retail store, via mail, or as an insert in another publication such as a newspaper or magazine.

These traditional forms of advertising and marketing, however, can sometimes fail to make a personal or emotional connection with the consumer. On the other hand, a personal story from a fellow consumer with respect to the purchase and use of a particular product may impact the consumer on a personal and emotional level. Further, traditional printed circulars do not provide the shopper or consumer access to other related content and information that may be available regarding the goods and services described in the circular.

SUMMARY

This section provides a general summary of the disclosure, and is not a comprehensive disclosure of its full scope or all of its features.

In various embodiments of the present disclosure a method is disclosed that includes receiving and storing, at a server, retail product data related to at least one retail product offered for sale at a retailer, the retail product data including text data corresponding to a description of the at least one retail product, price data corresponding to a price of the at least one retail product, and image data corresponding to a graphical image of the at least one retail product. The method also includes receiving, at the server, a plurality of links to content generated by at least one content-generating user, the content being associated with a plurality of retail products. The method also includes identifying, at the server, at least one link from the plurality of links that corresponds to content associated with the at least one retail product offered for sale at the retailer. The method also includes generating, at the server, a web page that displays the product data, including the text data, the price data, and the image data for the at least one retail product offered for sale at the retailer and that displays the identified at least one link.

In various embodiments of the present disclosure, a server is disclosed. The server includes a computer readable storage medium storing instructions executable by a processor for: receiving and storing retail product data related to at least one retail product offered for sale at a retailer, the retail product data including text data corresponding to a description of the at least one retail product, price data corresponding to a price of the at least one retail product, and image data corresponding to a graphical image of the at least one retail product; receiving a plurality of links to content generated by at least one content-generating user, the content being associated with a plurality of retail products; identifying at least one link from the plurality of links that corresponds to content associated with the at least one retail product offered for sale at the retailer; and generating a web page that displays the product data, including the text data, the price data, and the image data for the at least one retail product offered for sale at the retailer and that displays the identified at least one link.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
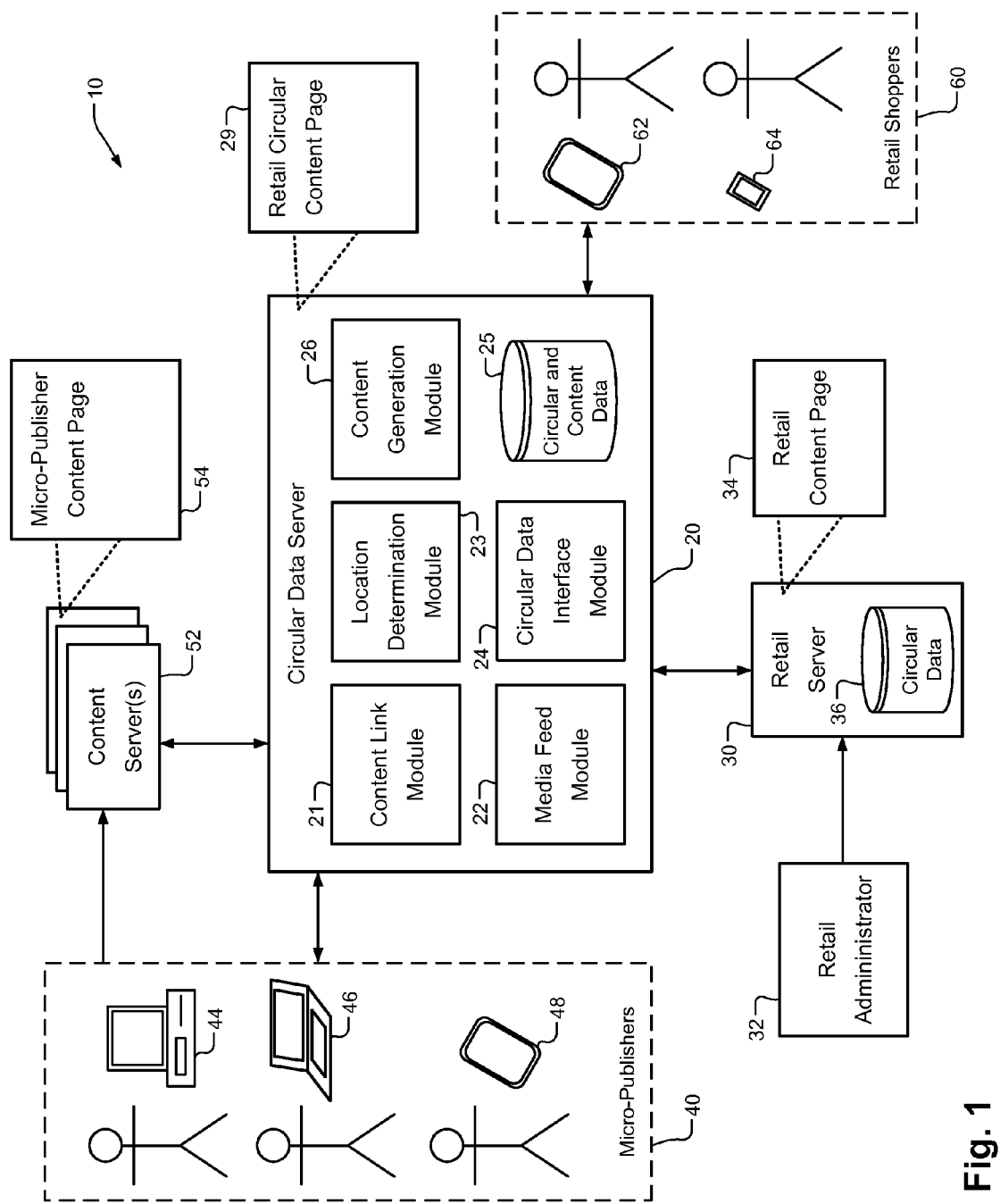
FIG. 1 illustrates an example system for online collection and distribution of retail and shopping related information according to some embodiments of the present disclosure.

With reference to FIG. 1, a system 10 for collection and distribution of retail and shopping information is shown and includes, for example, a circular data server 20 in communication with a retail server 30, a group of micro-publishers 40, one or more content server(s) 52, and one or more content-viewing users, such as retail shoppers 60. Communication between the circular data server 20, the retail server 30, the micro-publishers 40, the content server(s) 52 and the content-viewing users, such as the retail shoppers 60 may be facilitated over a communication network such as the internet. As described in further detail below, the circular data server 20 receives retail product data from the retail server 30 and receives links to content generated by the micro-publishers 40. The circular data server 20 can then identify particular micro-publisher generated content that corresponds to products or services described in the retail product data received from the retail server. Based on the identified corresponding content, the circular data server 20 can then generate a retail circular content page 29, for viewing by one or more content viewing users, such as retail shoppers 60, that includes both the retail product data and links to corresponding content generated by the micro-publishers 40.

Figure 2A:
FIG. 2A is an example screen shot of generated content in accordance with the present disclosure.
Figure 2B:
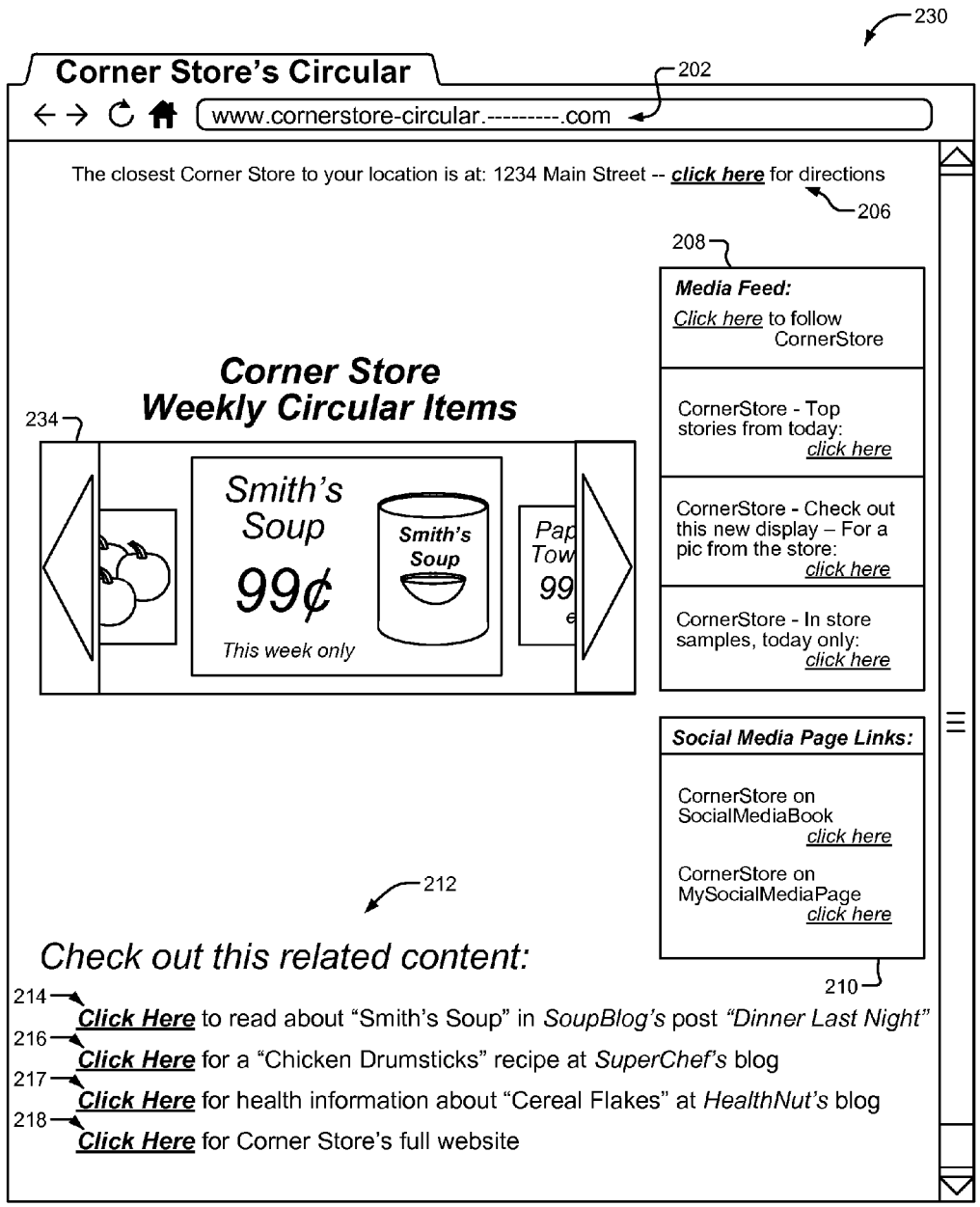
FIG. 2B is an example screen shot of generated content in accordance with the present disclosure.

With reference to FIGS. 2A and 2B, screenshots for example retail circular content pages 200 and 230 are shown as rendered in a user's web browser. In FIG. 2A, for example, a retail circular 204 can include retail product data about various products, including special deals and pricing. The retail circular 204 may, for example, correspond to a printed circular that is distributed by hand at a store, by mail, or by inclusion as an insert in another publication such as a newspaper or magazine. Further, links to particular micro-publisher generated content, i.e., content generated by micro-publishers 40, are shown at links 214, 216, and 217. As discussed in further detail below, retail circular content pages 200 and 230 also include a media feed section 208 and a social media page links section 210.

With reference again to FIG. 1, circular data server 20 may include a content link module 21, a media feed module 22, a location determination module 23, a circular data interface module 24, a circular and content database 25 and a content generation module 26. The circular data server 20 may be a web server whereby retail circular content pages 29, for example, can be accessed via a web browser interface of a content-viewing user's computing device. In this way, the content generation module 26 may generate hyper-text markup language (html) code with suitable output frames to display output to users. As an example, the circular data server 20 may be built on a WordPress platform utilizing a BuddyPress plugin for social interaction and/or additional plugins to accomplish the functionality described herein.

The circular data interface module 24 of the circular data server 20 may receive circular data from a retail server 30 associated with a particular retailer. Alternatively, the circular data interface module 24 may receive circular data communicated directly from a retail administrator 32. For example, the retail server 30 may be administered by the retail administrator 32 and may include a circular database 36. The particular retailer may have a single retail location, or may have multiple retail locations spread out over a geographic area. For example, the retailer may be a national or international retailer with retail locations spread throughout the country and/or the world. The circular database 36 of the retail server 30 may store retail product data related to particular retail products offered for sale at one or more of the retailer's retail locations. The retail product data may include, for example, text data corresponding to a description of the particular retail product(s), price data corresponding to a current price or sale/discount price of the particular retail product(s), and a graphical image of the particular retail product(s). As an example, with reference to FIG. 2A, the retail circular 204 includes retail product data for a "Smith's Soup" product that is on sale for ninety-nine cents this week only.

With reference again to FIG. 1, the retail product data may also include associated location data. For example, particular products may be on sale at a discounted price at certain locations, but not at other locations. For example, particular products may be on sale at retail locations within a particular geographic area, such as a particular city, state, or region of the country.

The retail server 30 may be a web server that can be accessed via a web browser to display a retail content page 34. For example, the retail content page 34 may be a web page for the retailer and may include store hours, locations, etc. The retail content page 34 may also include links to retail circulars and retail product data.

The circular data interface module 24 may interface with the retail server 30 to receive retail circular data/retail product data stored in the circular database. For example, the retail circular data/retail product data may be pulled from retail server 30 by way of an Access Protocol Interface (API). Further, the retail product data may include a single graphic image, such as the retail circular 204 shown in FIG. 2A. In such case, the graphic image data for each of the retail products shown may be included in a single graphic image. Alternatively, the retail product data may include individual graphic image data for each of the retail products associated with a particular retail circular. The circular data interface module 24 may store the circular data/retail product data in the circular and content database 25 of the circular data server 20.

Figure 3:
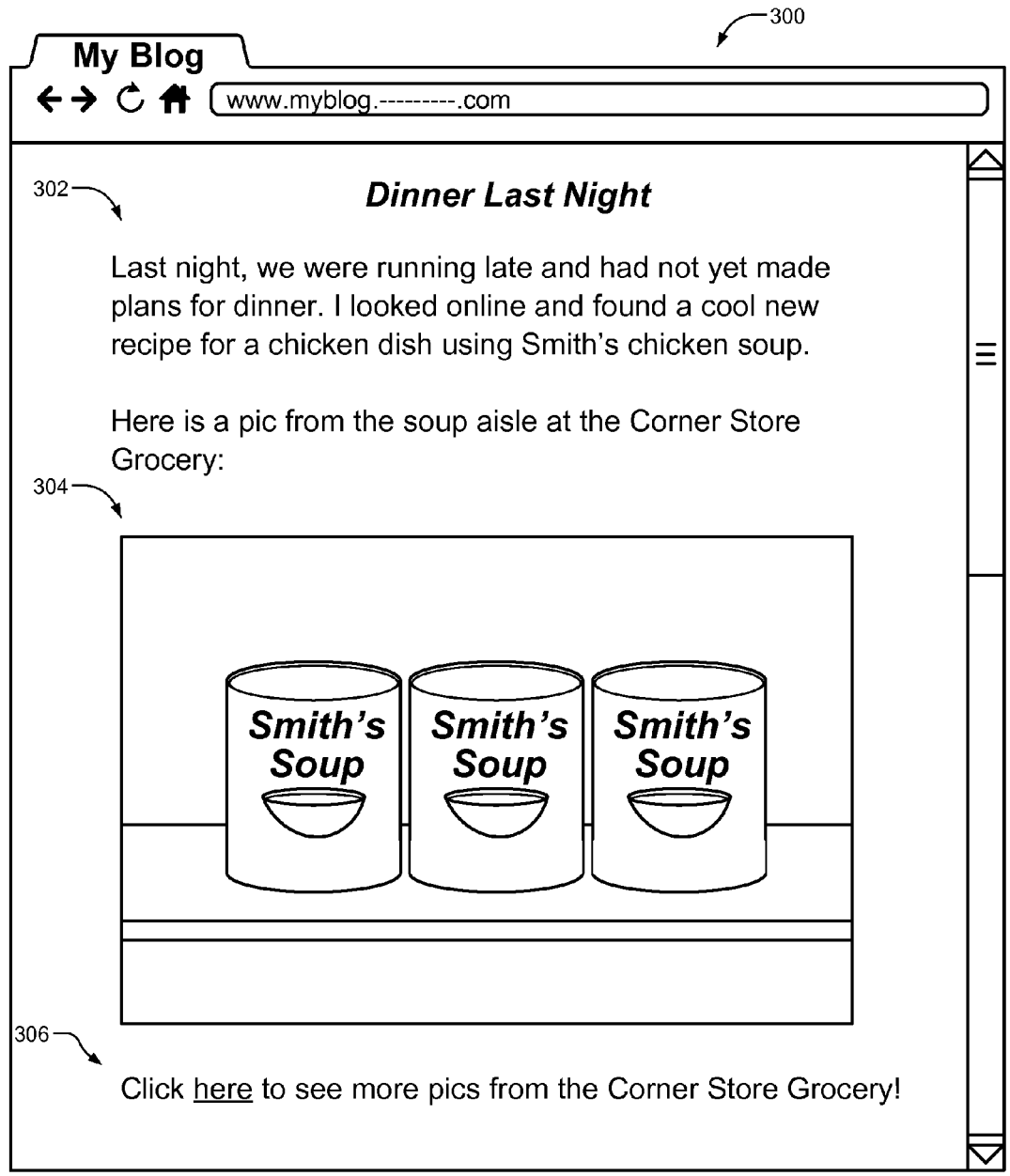
FIG. 3 is an example screen shot of generated content in accordance with the present disclosure.
Figure 4:
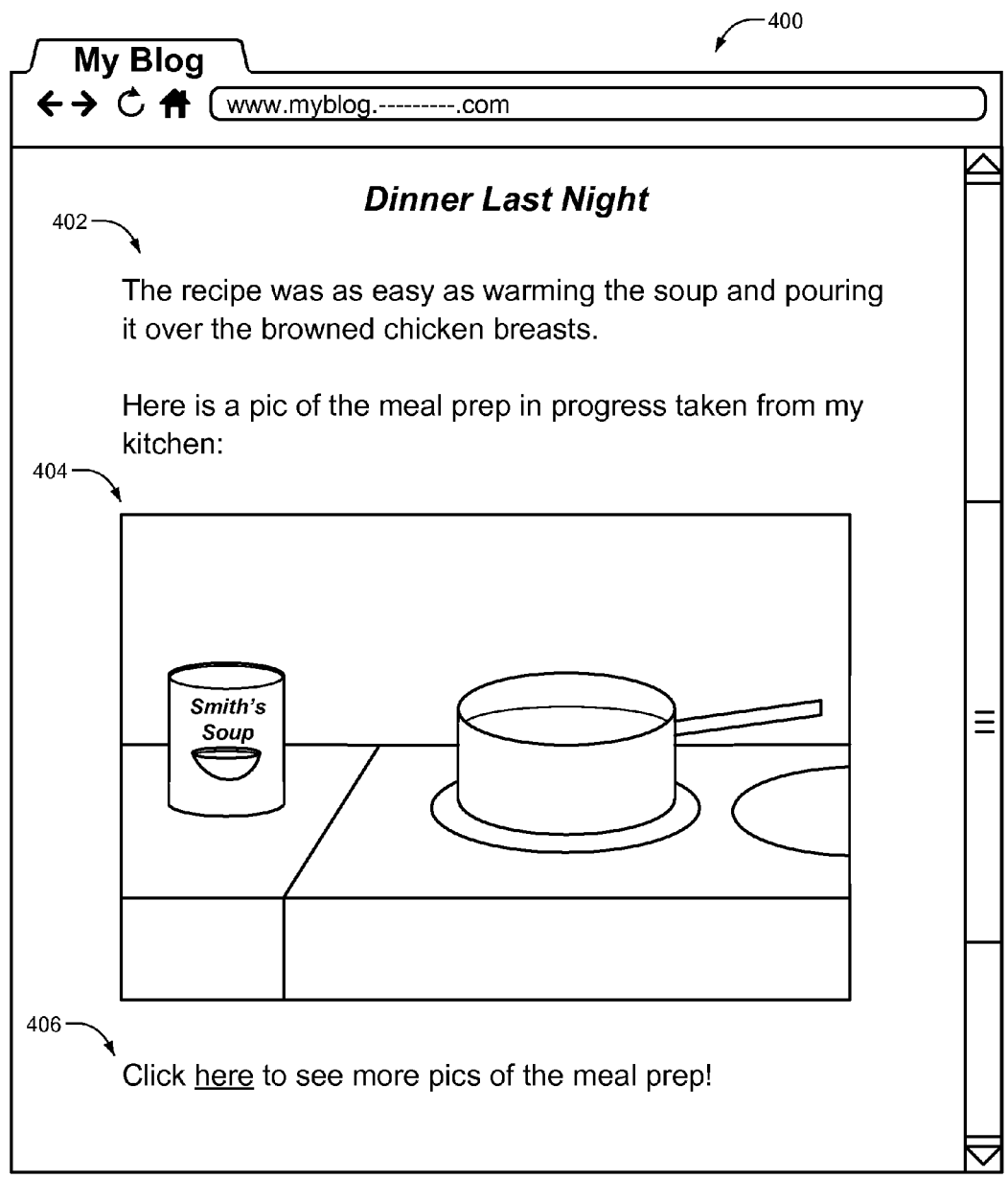
FIG. 4 is an example screen shot of generated content in accordance with the present disclosure.

Circular data server 20 may also include a content link module 21 that receives links to content generated by the group of content-generating users, or micro-publishers 40, and stored at content server(s) 52. The micro-publishers 40 may generate content using any number of devices including, for example, a desktop computer 44, a laptop computer 46, a tablet device 48, or any other suitable computing device, such as a mobile device or smartphone. Content generated by the micro-publishers 40 may be communicated to and stored and displayed at the content server(s). For example, a micro-publisher may operate a blog website with blog content viewable at a content page 54 that is stored and accessible over the internet through a content server 52. With reference to FIGS. 3 and 4, example blog pages 300 and 400 are shown.

Micro-publishers 40 may be members of a pre-approved group of micro-publishers. For example, micro-publishers 40 may be members of a member community, as described in co-pending U.S. application Ser. No. 13/603,517, which is commonly assigned with the present application, and which is incorporated herein by reference in its entirety.

With reference again to FIG. 1, the content link module 21 may receive links to content generated by the micro-publishers 40 and stored at the content server(s). Further, the content link module 21 may receive associated tags and keywords corresponding to particular retail products discussed, described, reviewed, or mentioned in the content generated by the micro-publishers 40. Additionally, the content link module 21 may also receive subject matter classifications and keywords associated with the content generated by the micro-publishers 40. The content link module 21 may store the received content links, and associated tags, keywords, and subject matter classifications, in the circular and content database 25.

Having received retail circular data corresponding to particular retail products, and having received links to user-generated content from the micro-publishers, the circular data server 20 may then identify any content links from the user-generated content that correspond to retail products included in the retail circular data. Specifically, the content generation module 26 may analyze the retail product data from the retail circular data and compare the particular retail products with the particular retail products discussed, described, reviewed, or mentioned in the content generated by the micro-publishers 40. The content generation module 26 may then establish and indicate such relationships in the circular and content database. For example, retail product data in a particular retail circular may be linked in the database to particular content generated by a micro-publisher about that same particular retail product. For further example, as shown in FIGS. 2A and 2B, a retail circular may include retail product data for "Smith's Soup," including a corresponding sale price for "Smith's Soup" this week only. Further, as shown in FIGS. 3 and 4, a micro-publisher 40 may have generated content regarding using "Smith's Soup" in connection with a meal preparation. In such case, the content generation module may store a link between the retail circular data that includes "Smith's Soup" and the user-generated content related to "Smith's Soup" in the circular and content database 25.

With reference again to FIG. 1, circular data server 20 includes a media feed module 22 that receives streamed social media posts over time. For example, media feed module 22 may receive social media posts in the form of tweets from a Twitter® feed.

With continued reference to FIG. 1, circular data server 20 may include a location determination module 23 for determining a location of a content-viewing user, such as retail shoppers 60. Retail shoppers 60 may utilize a tablet device 62, a mobile device 64, such as a smart phone, or any other suitable computing device to access content over the internet, for example, using a web browser. The web browser operating on the content-viewing user's device, such as the tablet device 62 or mobile device 64, may be enabled to sense its GPS location and provide that GPS location data on request. In this way, location determination module 23 may request and receive a GPS location for a particular content-viewing user, such as retail shoppers 60. Alternatively, in the event the content-viewing user's device is not enabled to provide its GPS location in response to a location request, the content-viewing user may instead be prompted to provide the content-viewing user's zip-code or address, for example. In this way, the location determination module 23 may determine a location of content-viewing users, such as retail shoppers 60.

Once a location of the content-viewing user is determined, content generation module 26 may then generate a retail circular content page 29 based on the retail circular data and content data from the circular and content database 25 and based on the location data for the particular content-viewing user from the location determination module 23.

Figure 5:
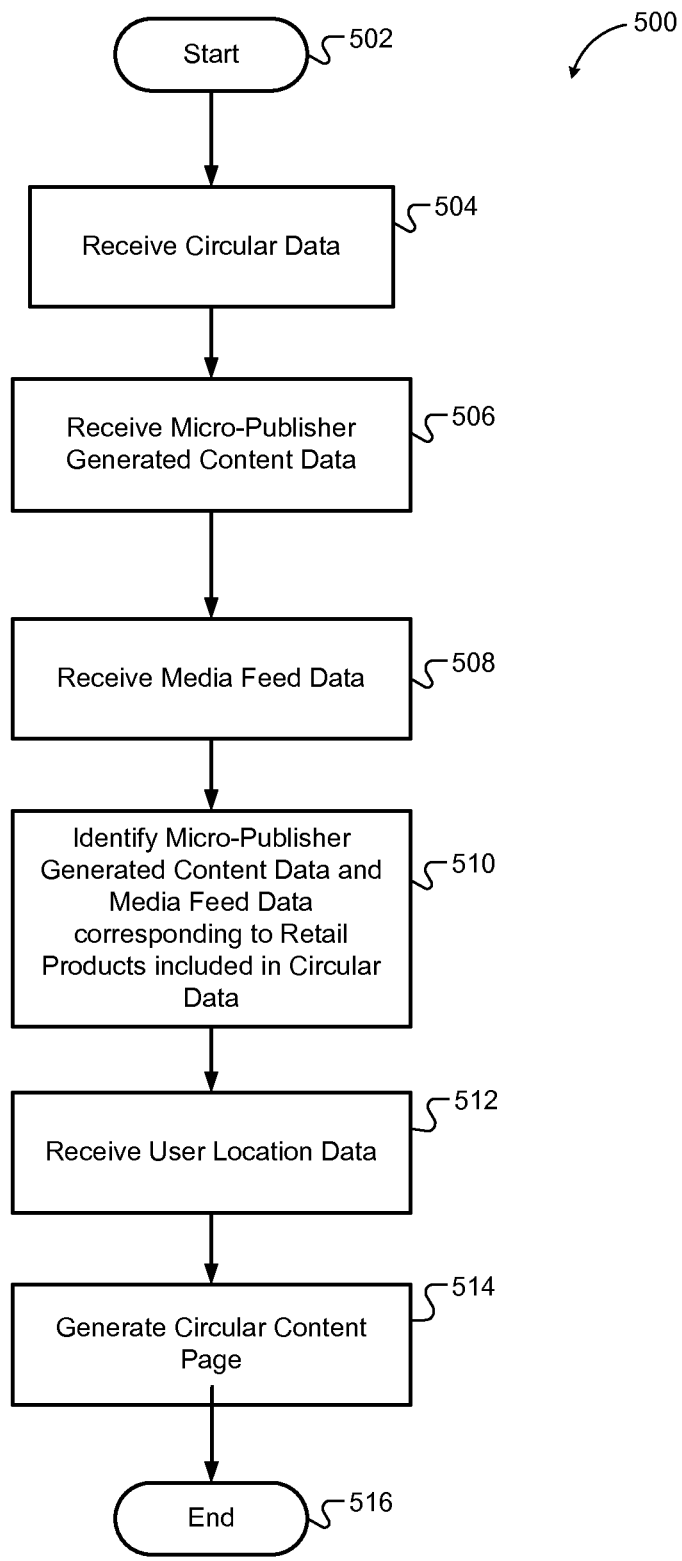
FIG. 5 is a flow chart illustrating a technique of the present disclosure.

For example, with reference to FIG. 5 a technique 500 for generating a retail circular content page 29 is shown. The steps of the technique may generally be performed by the circular data server 20. The technique starts at 502.

At 504, the circular data interface module 24 of the circular data server 20 receives retail circular data. As described above, the retail circular data may include text data, price data, and image data associated with a particular retail product. The retail circular data may also include location data for a corresponding retail location associated with the retail circular data.

At 506, the content link module 21 of the circular data server 20 receives micro-publisher generated content data from content-generating users, such as micro-publishers 40. As discussed above, the micro-publisher generated content data includes links to generated content, such as the content shown, for example, at FIGS. 3 and 4.

At 508, the media feed module 22 receives streamed media posts that may related to particular retail products or to a particular retailer.

At 510, the content generation module 26 identifies particular micro-publisher generated content data and media feed data that corresponds to particular retail products included in the retail circular data.

At 512, the location determination module 23 receives and determines a location of a content-viewing user, such as retail shoppers 60.

At 514, the content generation module 26 generates a retail circular content page 29 based on the retail circular data, the micro-publisher generated content data, the media feed data, and the location data. The technique ends at 516.

Examples of generated retail circular content pages 29 are shown in FIGS. 2A and 2B.

With reference to FIG. 2A, a first retail circular content page 200, available at URL 202, is shown as rendered in a web browser. The retail circular content page 200 includes an image of a retail circular 204, similar to a circular that may be distributed in print at a retail location for example. As shown in FIG. 2A, the image of the retail circular 204 may be a single graphic image and includes advertisements for items such as "Smith's Soup" at ninety-nine cents—a sale good for "this week only." The retail circular 204 also includes advertisements for Chicken Drumsticks and Cereal Flakes.

The retail circular content page 200 is for a store known as the Corner Store, as an example, and includes location information 206 indicating that the closest Corner Store to the content-viewing user's location is at 1234 Main Street. If, for example, the Corner Store is a national chain with many retail locations, the particular retail circular 204 shown would be a specific retail circular 204 corresponding to the retail location that is closest to the content-viewing user's location.

A Media Feed section 208 is included in the retail circular content page 200 and includes media feed items that relate to the Corner Store. For example, the Media Feed section 208 may include a social media feed, such as a Twitter® feed.

Additionally, a Social Media Page Links section 210 is included in the retail circular content page 200 and includes links to other Social Media content pages associated with the retailer.

At 212, a related content section 212 is included in the retail circular content page 200. For example, links 214, 216, 217 are provided to micro-publisher generated content. For example, link 214 includes a link to a blog post related to "Smith's Soup" by a blogger named "SoupBlog" and titled "Dinner Last Night." Further, link 216 includes a link to a post by blogger SuperChef related to Chicken Drumsticks and link 217 includes a link to a post by blogger HealthNut related to Cereal Flakes. Each of these particular retail products—Smith's Soup, Chicken Drumsticks, and Cereal Flakes—are retail products included in the retail circular 204.

The related content section 212 also includes a link 218 to the Corner Store's full retail website.

With respect to link 214 related to the Smith's Soup product, examples of generated content by a micro-publisher 40 are shown in FIGS. 3 and 4. The example content relates to the Smith's Soup product and involves a story that follows the blogger's preparation of a dinner meal. As shown in FIG. 3, the generated content 300 includes text content 302 related to the purchase of the product. Further, the generated content 300 also includes image content 304 showing the product in the store on a shelf at the store. The generated content 300 also includes a link 306 to additional image content showing the product at the store. As shown in FIG. 4, the generated content 400 also includes text content 402 related to the use of the product in a recipe. Further, the generated content 400 includes image content 404 showing the meal preparation using the product. The generated content 400 also includes a link 406 to additional image content showing the meal preparation using the product. Further discussion of micro-publisher generated content related to particular retail products, and a system and method for online submission, collection, and distribution of product and shopping related information is described in co-pending U.S. application Ser. No. 13/603,517, which is commonly assigned with the present application, and which is incorporated herein by reference in its entirety.

With reference to FIG. 2B, a second retail circular content page 230 is shown as rendered in a web browser. The second retail circular content page 230 is similar to the first retail circular content page 200, except that in the second retail circular content page 230, the individual retail products from the retail circular data are displayed individually in a scrolling display 234. The scrolling display 234 can be used, for example, if the circular data includes individual and separate image data for each of the retail products including in the circular data. The scrolling display 234 may automatically scroll left or right. Alternatively, or additionally, a user may navigate through the scrolling display 234 using the left and right arrows at the edges of the scrolling display.

Figure 6:
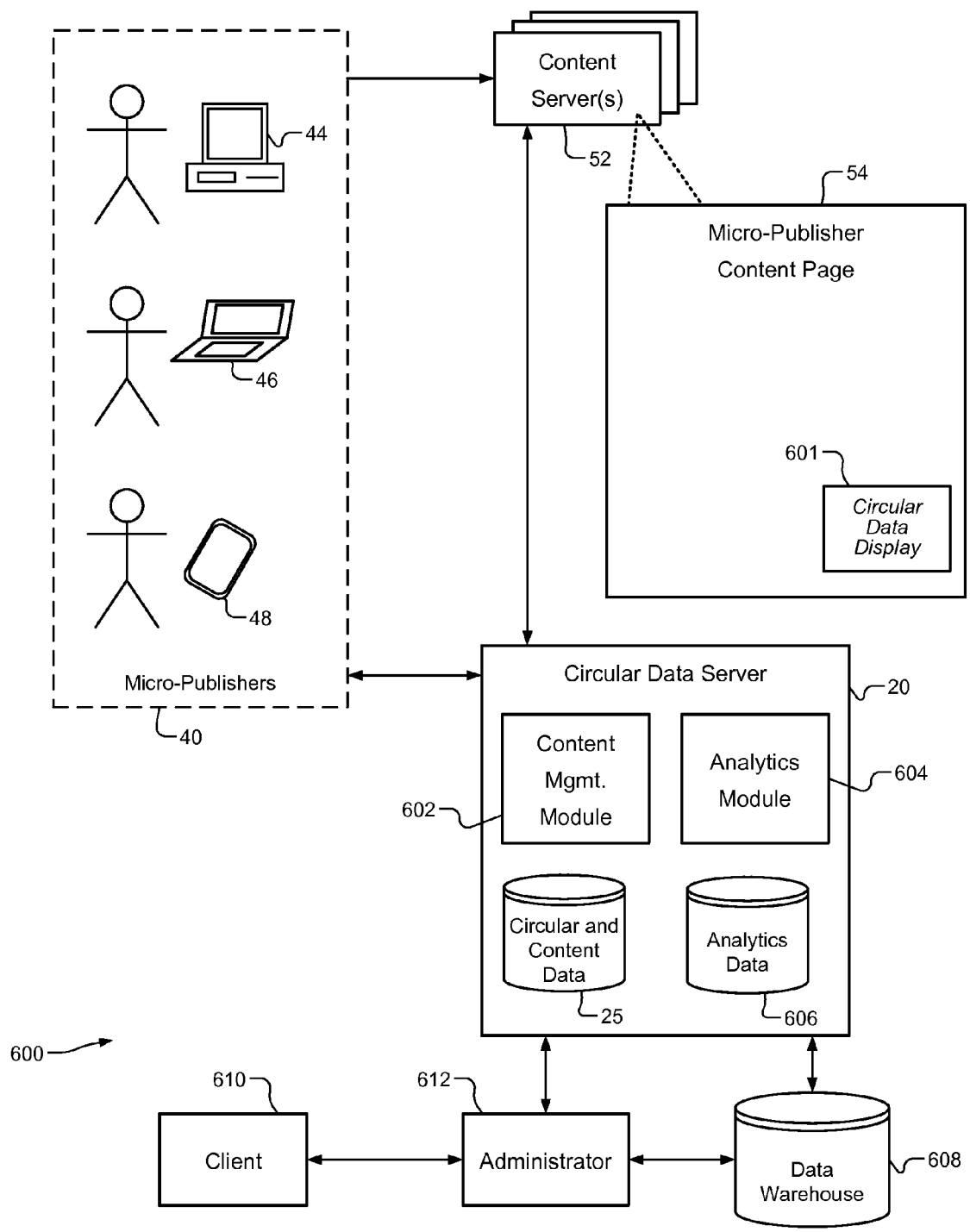
FIG. 6 illustrates another example system for online collection and distribution of retail and shopping related information according to some embodiments of the present disclosure.

With reference to FIG. 6, additional features of another system 600 for collection and distribution of retail and shopping information is shown. Specifically, additional modules of the circular data server 20 are shown. For example, the circular data server 20 may include a content management module 602, an analytics module 604, and an analytics database 606.

The content management module 602 may facilitate the insertion of a display section on a micro-publisher generated content page 54 for inclusion of corresponding retail circular data. For example, micro-publisher content page 54 may include a circular data display section 601. The circular data display section 601 may include links back to retail circular content pages 29 with retail products related to the content of the micro-publisher content page. For example, if the micro-publisher content page 54 is referenced and linked in a retail circular content page 29, the micro-publisher content page 54 may then include a link in the circular data display section 601 back to that particular retail circular content page 29. Further, links may also be included in the circular data display section 601 to particular retail circular content pages 29 that are related by geographic area, by keyword, by subject matter, etc., to the content of the micro-publisher content page 54.

Figure 7:
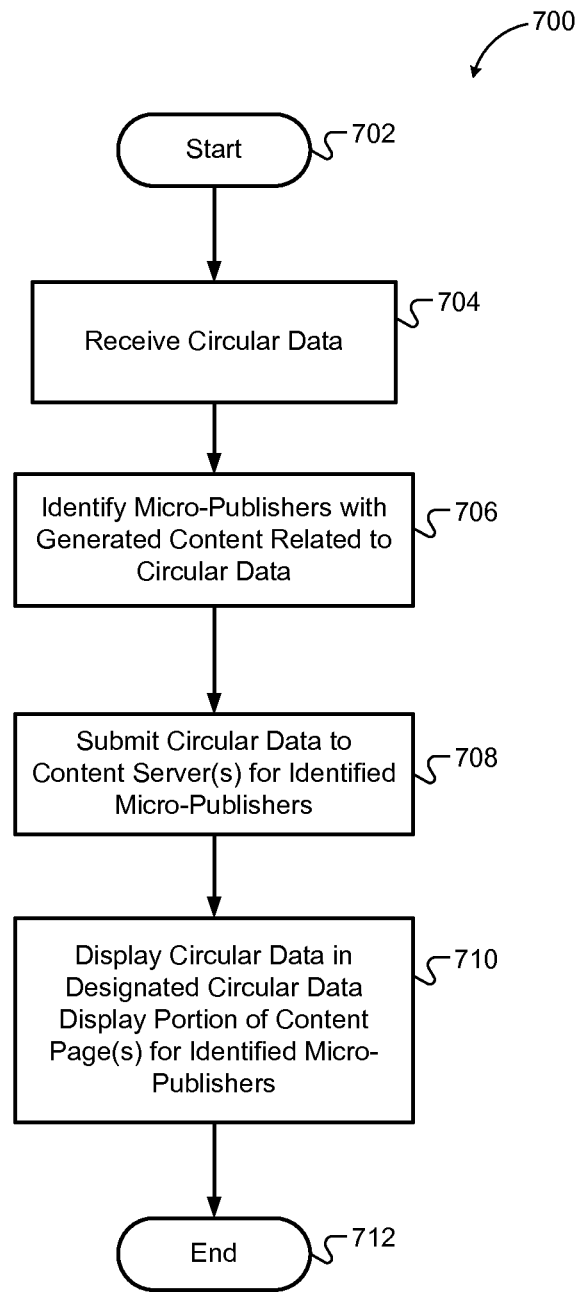
FIG. 7 is a flow chart illustrating a technique of the present disclosure.

With reference to FIG. 7, a technique 700 for generating content for a circular data display section 601 of a micro-publisher content page 54 is shown. The steps of the technique may generally be performed by the circular data server 20. The technique starts at 702.

At 704, the circular data server 20 receives retail circular data and at 706 identifies micro-publishers with generated content related to the retail circular data, as discussed in detail above.

At 708, the content management module 602 of the circular data server 20 submits retail circular data to the content server(s) 52 for the associated identified micro-publishers.

At 710, the content server(s) display the received circular data in the designated circular data display section 601 of the content pages for the identified micro-publishers. At 712, the technique ends.

By cross-linking content between the micro-publisher generated content pages and the retail circular content pages, the relative importance of the pages, as determined or estimated by various search engine algorithms, may be increased. In this way, the system 600 may facilitate a search engine optimization (SEO) benefit for system participants, including, for example, retailers and micro-publishers.

With reference again to FIG. 6, the circular data server 20 may include an analytics module 604 and an analytics database 606 for monitoring, receiving, and storing analytics data associated with tracking impressions, click-throughs, and conversion time-stamps. This analytical data can be collected and stored and then reviewed later by an administrator 612 or a client 610, for example, another retailer, that is considering participating in a system for collection and distribution of retail circular data and shopping related information.

For example, all data of the circular data server 20 can be stored at a data warehouse 608 that can then be accessed and queried by a system administrator 612. The administrator 612, for example, may share such analytical data with a new client, such as a retailer, that is considering participating in such a system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Further, example embodiments are provided so that this disclosure will be thorough, and will fully convey the scope to those who are skilled in the art. Numerous specific details are set forth such as examples of specific components, devices, techniques, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

As used herein, the term module may refer to, be part of, or include: an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses, techniques, and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A method comprising:
   receiving, with a circular data server, retail product data from a retail server associated with a retailer, the retail product data corresponding to at least one retail product offered for sale by the retailer, and the retail product data including text data corresponding to a description of the at least one retail product, price data corresponding to a price of the at least one retail product, and image data corresponding to a graphical image of the at least one retail product;
   storing, with the circular data server, the retail product data;
   receiving, with the circular data server, a plurality of links to a plurality of content web pages stored on at least one content server, the content web pages each including content generated by at least one content-generating user;
   comparing, with the circular data server, the retail product data for the at least one retail product with the content of each content web page of the plurality of content web pages;
   identifying, with the circular data server, at least one content web page that includes content associated with the at least one retail product offered for sale by the retailer based on the comparing;
   generating, with the circular data server, a retail circular web page that displays the retail product data, including the text data, the price data, and the image data for the at least one retail product offered for sale by the retailer and that displays at least one link to the identified at least one content web page;
   cross-linking the generated retail circular web page with the identified at least one content web page by inserting, with the circular data server, a circular data display section into the identified at least one content web page through communication with the at least one content server storing the identified at least one content web page, the circular data display section including a link to the generated retail circular web page;
   receiving, with the circular data server, a location of a content-viewing user;
   identifying, with the circular data server, a particular retail location from the plurality of retail locations based on the received location of the content-viewing user; and
   identifying, with the circular data server, location specific retail product data associated with at least one retail product offered for sale at the particular retail location;
   wherein identifying the at least one content web page includes identifying at least one content web page that includes content associated with the at least one retail product offered for sale at the particular retail location; and
   wherein generating the retail circular web page includes generating the retail circular web page to display the location specific retail product data and to display at least one link that corresponds to the identified at least one content web page that includes content associated with the at least one retail product offered for sale at the particular retail location.

2. The method of claim 1, wherein the retail product data corresponds to a printed circular distributed to a plurality of shoppers at a retail location of the retailer.

3. The method of claim 1, further comprising:
   receiving, at the circular data server, a plurality of media feed items; and
   identifying, at the circular data server, at least one media feed item from the plurality of media feed items that corresponds to the at least one retail product offered for sale by the retailer;
   wherein generating the retail circular web page includes generating the retail circular web page to display the identified at least one media feed item.

4. The method of claim 1, wherein the retail product data includes retail product data associated with a plurality of retail products offered for sale by the retailer, and wherein the retail product data includes a single graphic image that displays the text data, the price data, and the graphical image for each retail product in the plurality of retail products offered for sale by the retailer and wherein generating the retail circular web page includes generating the retail circular web page to display the single graphic image.

5. The method of claim 1, wherein the retail product data includes separate text data, price data, and image data for each retail product of the at least one retail product offered for sale by the retailer and wherein generating the retail circular web page includes generating the retail circular web page to display a scrolling display for individually displaying the text data, price data, and image data for each retail product of the at least one retail product offered for sale by the retailer.

6. The method of claim 1, wherein the at least one content-generating user is a member of a pre-approved community of content-generating members.

7. The method of claim 1, wherein the at least one retail product offered for sale by the retailer is included in a limited-time sale at the retailer, wherein the price data includes a limited-time sale price for the at least one retail product, wherein the product data further includes a time period associated with the limited-time sale, and wherein generating the retail circular web page includes generating the retail circular web page to display the time period associated with the limited-time sale.

8. A circular data server with a computer readable storage medium storing instructions executable by a processor for:
   receiving retail product data from a retail server associated with a retailer, the retail product data corresponding to at least one retail product offered for sale by a retailer, and the retail product data including text data corresponding to a description of the at least one retail product, price data corresponding to a price of the at least one retail product, and image data corresponding to a graphical image of the at least one retail product;
   storing the retail product data;

receiving a plurality of links to a plurality of content web pages stored on at least one content server, the content web pages each including content generated by at least one content-generating user;

comparing the retail product data for the at least one retail product with the content of each content web page of the plurality of content web pages;

identifying at least one content web page that includes content associated with the at least one retail product offered for sale by the retailer based on the comparing;

generating a retail circular web page that displays the retail product data, including the text data, the price data, and the image data for the at least one retail product offered for sale by the retailer and that displays at least one link to the identified at least one content web page;

cross-linking the generated retail circular web page with the identified at least one content web page by inserting a circular data display section into the identified at least one content web page through communication with the at least one content server storing the identified at least one content web page, the circular data display section including a link to the generated retail circular web page;

receiving a location of a content-viewing user;

identifying a particular retail location from the plurality of retail locations based on the received location of the content-viewing user; and identifying location specific retail product data associated with at least one retail product offered for sale at the particular retail location;

wherein identifying the at least one content web page includes identifying at least one content web page that includes content associated with the at least one retail product offered for sale at the particular retail location; and wherein generating the retail circular web page includes generating the retail circular web page to display the location specific retail product data and to display at least one link that corresponds to the identified at least one content web page that includes content associated with the at least one retail product offered for sale at the particular retail location.

9. The circular data server of claim 8, wherein the retail product data corresponds to a printed circular distributed to a plurality of shoppers at a retail location of the retailer.

10. The circular data server of claim 8, wherein the computer readable storage medium stores further instructions executable by the processor for:
receiving a plurality of media feed items; and
identifying at least one media feed item from the plurality of media feed items that corresponds to the at least one retail product offered for sale by the retailer;
wherein generating the retail circular web page includes generating the retail circular web page to display the identified at least one media feed item.

11. The circular data server of claim 8, wherein the retail product data includes retail product data associated with a plurality of retail products offered for sale by the retailer, and wherein the retail product data includes a single graphic image that displays the text data, the price data, and the graphical image for each retail product in the plurality of retail products offered for sale by the retailer and wherein generating the retail circular web page includes generating the retail circular web page to display the single graphic image.

12. The circular data server of claim 8, wherein the retail product data includes separate text data, price data, and image data for each retail product of the at least one retail product offered for sale by the retailer and wherein generating the retail circular web page includes generating the retail circular web page to display a scrolling display for individually displaying the text data, price data, and image data for each retail product of the at least one retail product offered for sale by the retailer.

13. The circular data server of claim 8, wherein the at least one content-generating user is a member of a pre-approved community of content-generating members.

14. The circular data server of claim 8, wherein the at least one retail product offered for sale by the retailer is included in a limited-time sale at the retailer, wherein the price data includes a limited-time sale price for the at least one retail product, wherein the product data further includes a time period associated with the limited-time sale, and wherein generating the retail circular web page includes generating the retail circular web page to display the time period associated with the limited-time sale.

* * * * *